No. 836,690. PATENTED NOV. 27, 1906.
I. LAZAGA & F. W. LEV.
PACKAGING MACHINE.
APPLICATION FILED APR. 1, 1905.
5 SHEETS—SHEET 2.
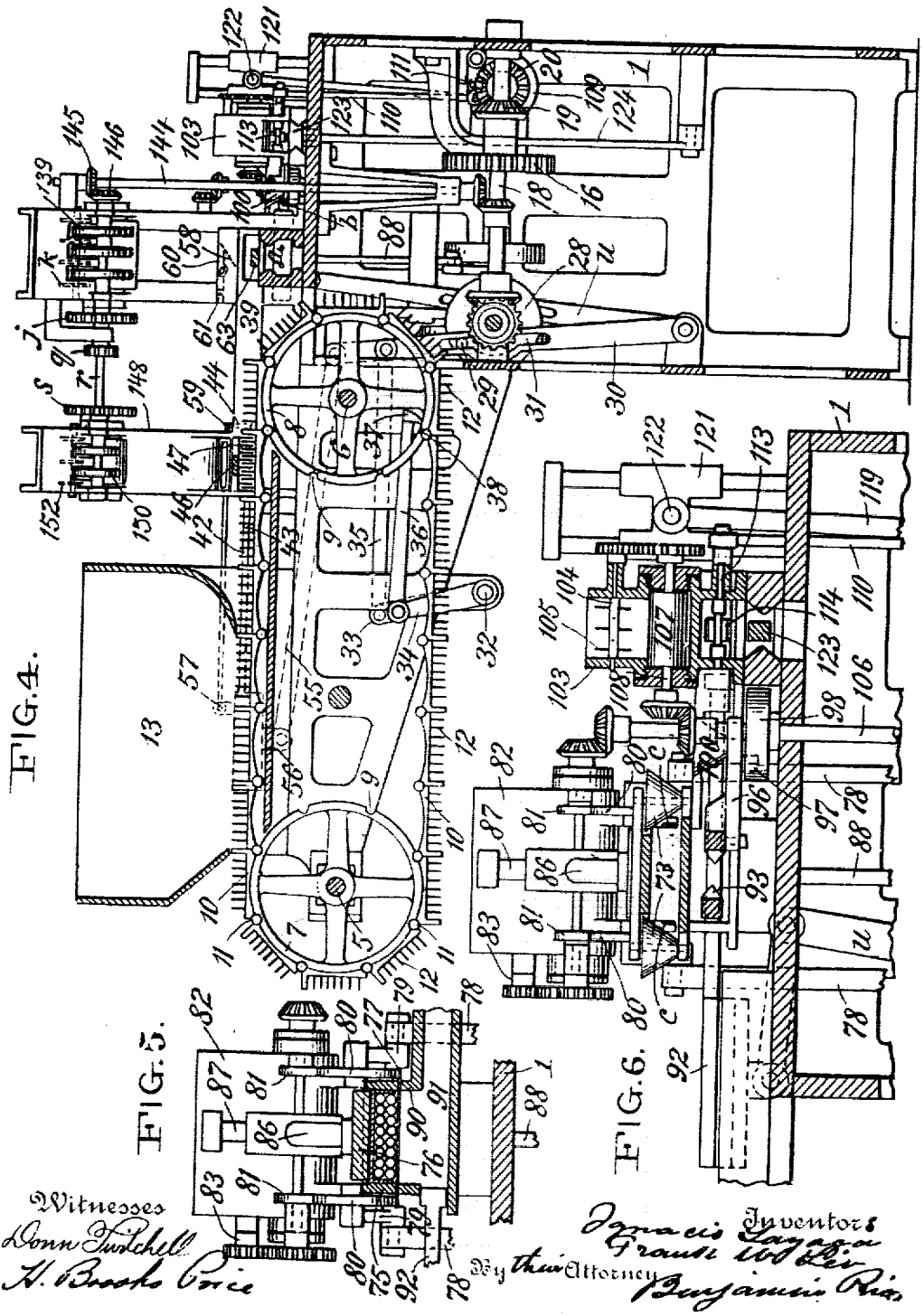

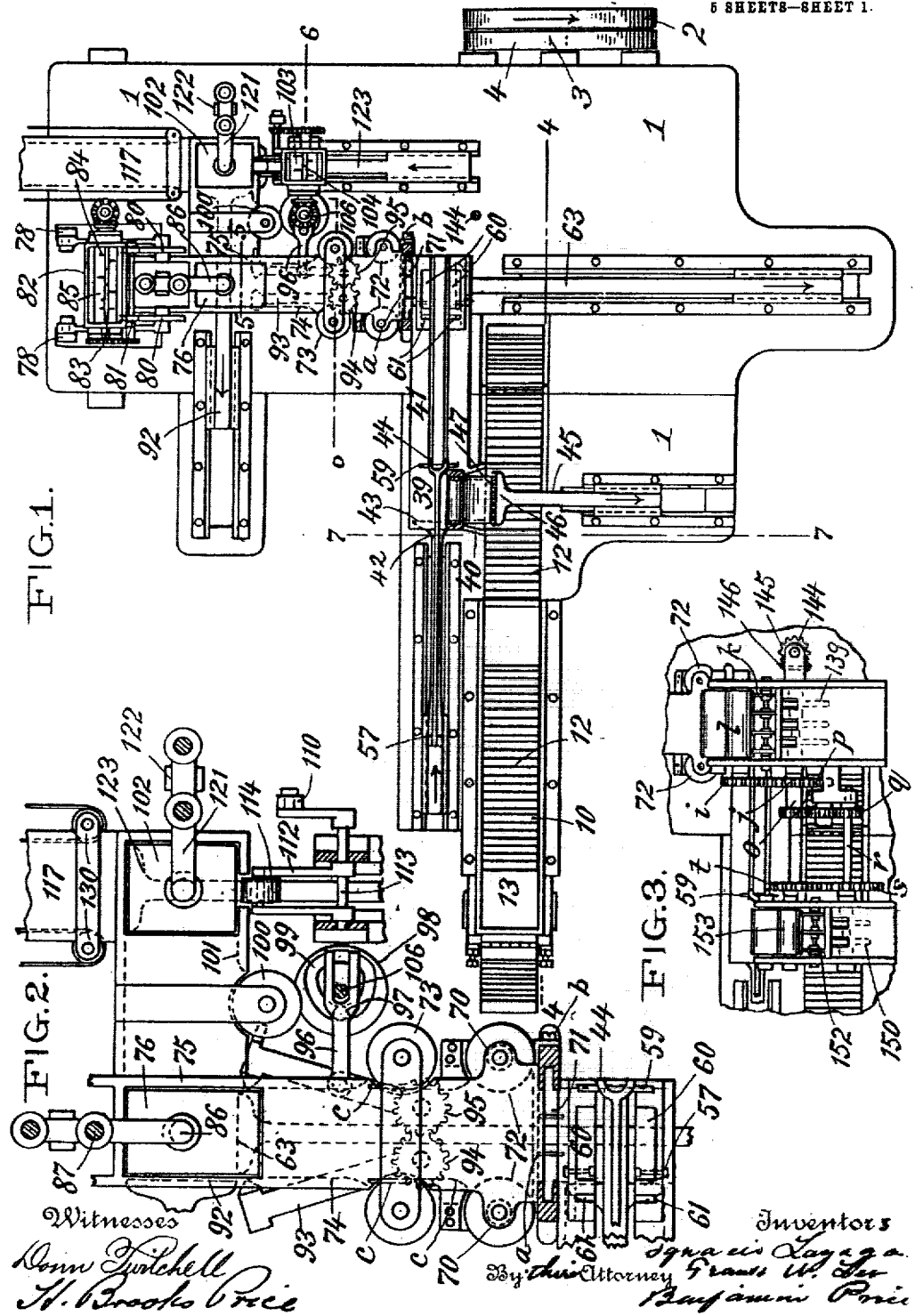

No. 836,690. PATENTED NOV. 27, 1906.
I. LAZAGA & F. W. LEV.
PACKAGING MACHINE.
APPLICATION FILED APR. 1, 1905.

5 SHEETS—SHEET 3.

Witnesses
Inventors

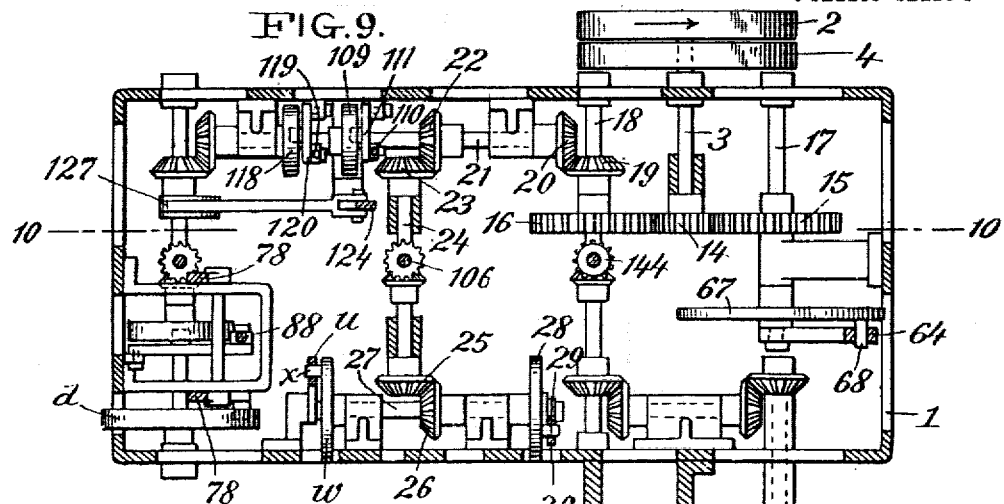
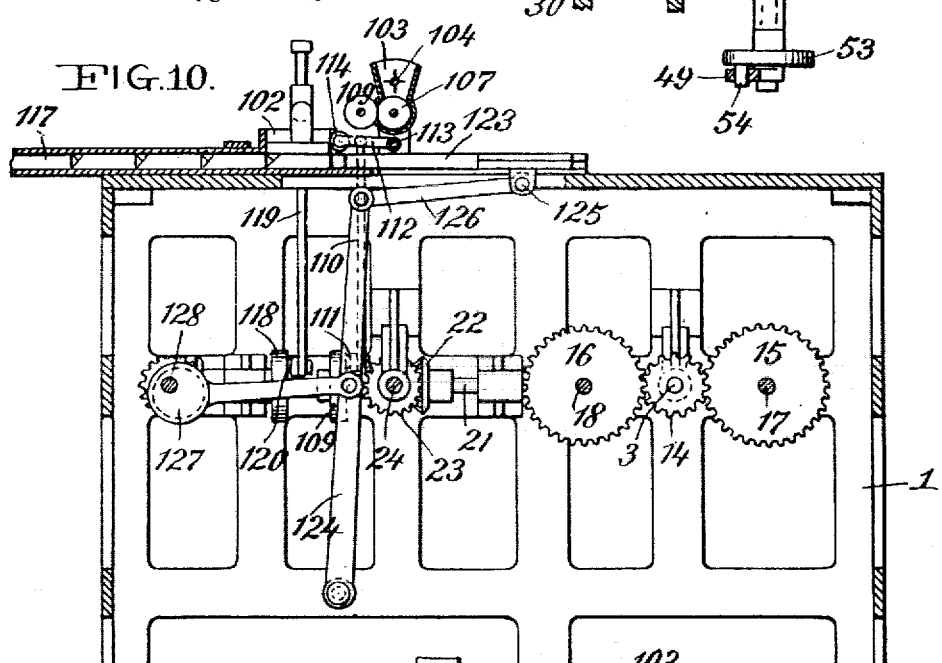
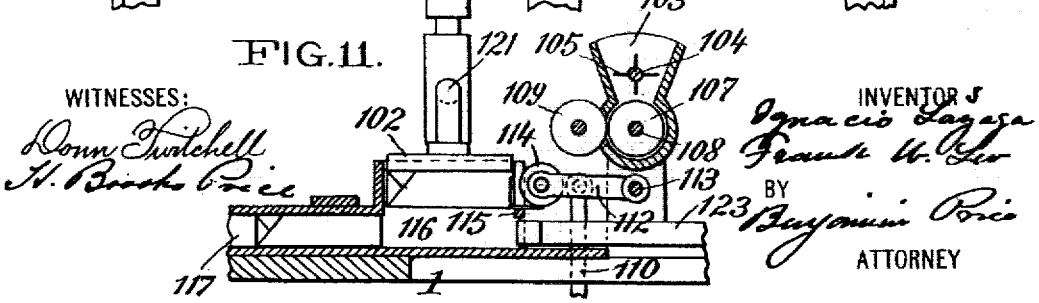

No. 836,690. PATENTED NOV. 27, 1906.
I. LAZAGA & F. W. LEV.
PACKAGING MACHINE.
APPLICATION FILED APR. 1, 1905.

6 SHEETS—SHEET 6.

WITNESSES:

INVENTORS
Ignacio Lazaga
Frank W. Lev
BY
Benjamin Price
ATTORNEY

UNITED STATES PATENT OFFICE.

IGNACIO LAZAGA, OF HAVANA, CUBA, AND FRANK W. LEV, OF NEW YORK, N. Y.

PACKAGING-MACHINE.

No. 836,690.  Specification of Letters Patent.  Patented Nov. 27, 1906.

Application filed April 1, 1905. Serial No. 253,262.

*To all whom it may concern:*

Be it known that we, IGNACIO LAZAGA, a citizen of the Republic of Cuba, residing in the city of Havana, Cuba, and FRANK W. LEV, a citizen of the Empire of Austria-Hungary, residing at present in the city of New York, State of New York, have invented certain new and useful Improvements in Packaging-Machines, of which the following is a full description.

Our invention is intended for use in packaging or putting in wrappers small articles of commerce, such as cigars, cigarettes, soaps, chocolates, chewing-gum, and other articles of like character, which are introduced in the machine, assorted, guided and impelled from one part of the machine to another, and during the passage through the machine are wrapped into packages of paper or cardboard, which are folded around and about the article, and is finally discharged in a condition to be sold.

The accompanying drawings illustrate the machine, of which—

Figure 7:
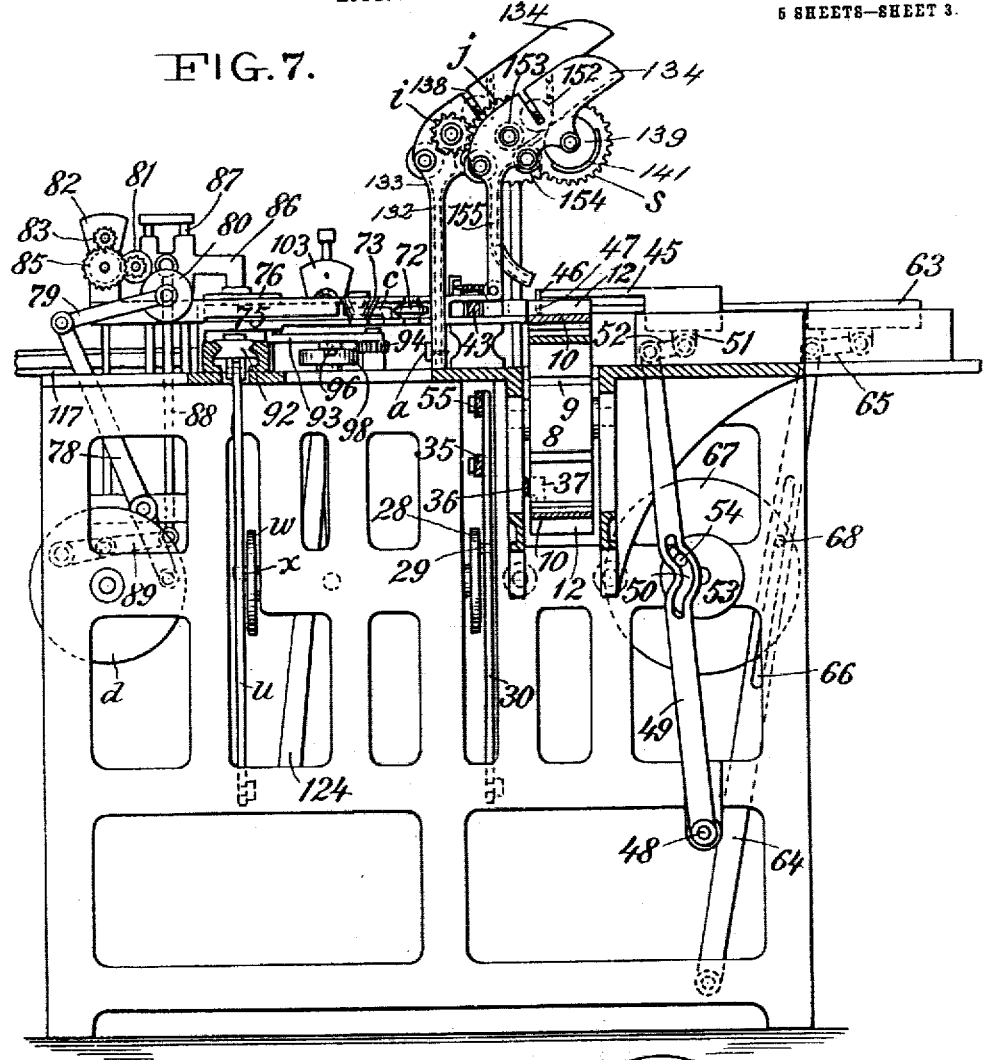
Figure 8:
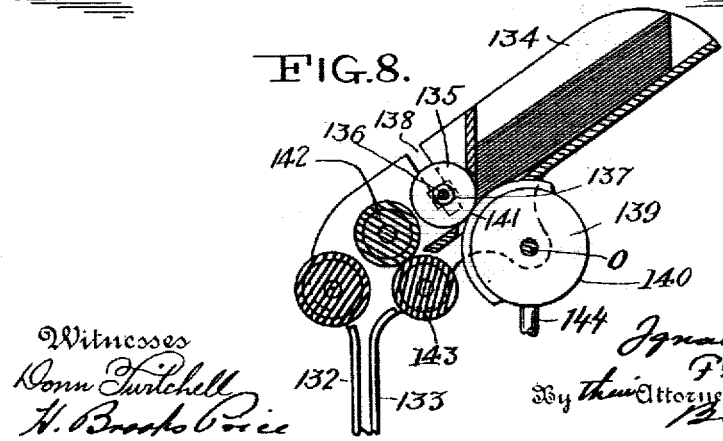
Figure 12:
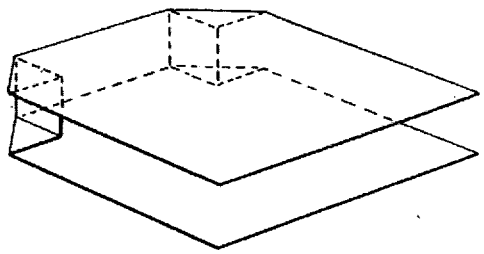
Figure 13:
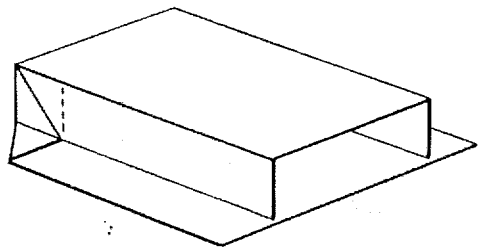
Figure 14:
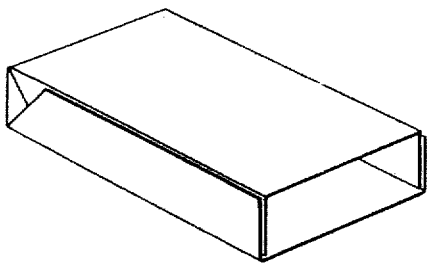

Figure 1 is a plan view of the machine. Fig. 2 is also a plan view showing the folding devices, press, and part of the drying-trough; Fig. 3, a plan view of the distributer of cards or coupons; Fig. 4, a horizontal section of the machine, taken on line 4 4 of Fig. 1. Fig. 5 is a horizontal section taken on line 5 5 of Fig. 1, showing a package of cigarettes within the compressor ready to be lowered; Fig. 6, a horizontal section on line 6 6 of Fig. 1; Fig. 7, a horizontal section of part of the machine on line 7 7 of Fig. 1; Fig. 8, a sectional view of the paper-feeding device; Fig. 9, a plan view of the lower parts of the apparatus, showing the machinery below the table; Fig. 10, a horizontal section taken on line 10 10, Fig. 9; Fig. 11, a sectional view of the device for applying the gum or glue to the margin of the package. Figs. 12, 13, 14, 15, 16, and 17 are different views of the package, showing the stages through which the wrapper of the article passes in folding it around the articles to be inclosed within the package.

Upon a table or platform 1 1 are arranged the parts of the apparatus for distributing the articles to be put into the package and for guiding and folding them into an appropriate wrapper, and below the platform is located the machinery which gives movement to the various parts of the apparatus, of which 2 is a pulley revolved by a belt, 3 is a shaft to which the pulley is attached, and 4 an idle or loose pulley mounted on shaft 3, upon which the belt may be shifted to stop the machine.

Suitably journaled in the frame are the shafts 5 and 6, Fig. 4, which carry the sprocket or notched wheels 7 and 8. The wheel 7 is an idle wheel turned by an endless-chain carrier, and the other wheel 8 has an intermittent movement and travels one section of given distance at a time. These sections are shown in the form of notches 9 on both wheels.

The endless-chain carrier is shown at 10 and is divided into sections of a distance apart regulated by the size or form of the article to be carried. These sections are indicated by a spindle or pin 11 at the end of each of the sections, which acts as a hinge and enters the notches 9 in the wheels to facilitate the movement of the carrier and also to make a stopping-place as the carrier moves. In packing articles such as cigarettes or cigars the carrier is provided with projecting fingers 12, standing perpendicularly upon the carrier, so that they form a slot between them.

Although the machine is capable of use for other purposes as aforesaid, the apparatus we are now describing is especially adapted to packing cigarettes and will be so described throughout.

Above and over the carrier is placed a box or hopper 13, open at the bottom, and the cigarettes are placed in this box crosswise, so as to lie parallel with the slots in the carrier and fill them. The arrangement of carrier as herein shown will accommodate two cigarettes one above the other in the slots, and each of the sections of the carrier contains eight slots, making in all sixteen cigarettes in each section of the carrier. As each of the sections contains a charge for a wrapper, it follows that each of the packages will contain sixteen cigarettes. It will readily be seen, however, that the number may be varied at will.

The movement to all the operative parts of the machine is imparted by the shaft 3. Viewing Fig. 9, it will be seen that this shaft is provided with the pinion 14, which is geared with the cogged wheels 15 and 16 and revolves the shafts 17 and 18. The bevel-wheel 19, gearing with the wheel 20, revolves the shaft 21, which carries the bevel-wheel 22, meshing with 23, revolves the shaft 24. At the end of this shaft the bevel 25 meshes with 26 and turns the shaft 27. This shaft carries a disk 28, provided with a pin 29. This disk and pin are shown on Fig. 4, to which we will return to explain the intermittent movement of the carrier. Suitably pivoted to the framework of the machine is the lever 30, provided with the slot 31. Into this slot projects the pin 29 on the disk 28 and as the disk revolves imparts a reciprocating movement to the lever 30. On a shaft 32 are erected two levers 33 and 34. A rod or bar 35 connects 33 to the reciprocating-lever 30, and a bar 36, pivoted to the end of 34, carries a pawl or dog 37 on its end. On the inner side of the rim of the wheel 8 are the notches 38, spaced apart a distance regulated to give a movement to the carrier equal to one of its sections. In the forward movement of the arm 36 the dog 37 rides upon the rim of the wheel and drops into one of the notches 38 at the end of this movement. On its return it revolves the wheel 8 until stopped at the end of its movement in that direction. Arranged along by the side of the carrier and parallel therewith is a box 39, Fig. 1. Its width is a little greater than the length of a cigarette; its depth sufficient to accommodate easily two cigarettes one lying on top of the other. It is provided with an opening 40, facing the carrier, large enough to admit the cigarettes from one of the sections and permit them to pass into the box. This box is provided with a slot 41. In line with the box, arranged in suitable guides, is a plunger 42, the head of which, 43, is shown in Fig. 1 lying just within the open end of the box. This plunger carries a rod provided on its end with a fork 44, which is bent down into the slot, and when the cigarettes enter the box they lie between the head of the plunger and the fork and are thus maintained in this position and prevented from falling or changing the shape of the charge for the package. At right angles to the carrier is shown another plunger 45, having a head 46, provided with teeth 47, bent downwardly like the prongs of a rake, Fig. 4, to enter the slots in the carrier and force out the cigarettes from one of the sections. The plunger travels in suitable guides erected upon the table of the machine. The impulses given to wheel 8 by the pawl 37 impels the carrier, with its load of cigarettes, until it stops with one of its sections just in front of the plunger-head 46 and facing the opening in the box. The plunger 45 then moves forward the teeth on its head entering the slots, forcing the cigarettes out of the slots in the carrier and into the box between the head of plunger 42 and the fork 44. The plunger 45 then retires, and the plunger 42 moves forward, carrying the cigarettes along until they reach the opening of the folding device.

The mechanism for impelling the plunger 45 is located under the table and is shown in Fig. 7. Suitably pivoted at 48 is a lever 49, provided with a slot 50 and connected at its upper end with a projection 51 by a link 52. The disk 53 is provided with a pin 54, which operates in the slot as the disk revolves, imparting a reciprocating motion to the lever 49 and the plunger 45. The mechanism for impelling the plunger 42 includes in part the same mechanism already described for moving the carrier, the lever 30 having a connecting-arm 55 pivoted to an extenson 56 from the plunger 42.

The rod which carries the fork 44 is hinged at 57, so that the forked end may rise at a proper time to leave the package between the head 43 of the plunger and the end of the box 39. Near the end of the box are placed the inclined planes 58, and the rod carrying the fork 44 is provided with a cross-pin 59, which rides upon the inclined planes. Two doors or flaps 60 in the top of the box are lifted by the cross-pin when it rises until the cross-pin passes beyond them, when they drop and close the entrance to the interior of the box. The cigarettes are now held by plunger-head 43 against the end of the box, and the plunger 42 is ready to be retired to its starting-point. The cross-pin drops upon the closed flaps and rides back upon the surface of the box until the fork 44 has retired behind the package. At a suitable point there is a cross-slot 61 in the top of the box, through which the cross-pin drops, leaving the fork in its original position in the box to return and be ready to receive a new charge between it and the plunger-head, while another plunger 63 is impelling the package into the folding device.

The cigarettes having been placed in front of the opening to the folding device, a plunger 63, working in suitable guides erected upon the table, forces the package into the folding device. The mechanism operating this plunger is also shown in Fig. 7. It consists of a lever 64, suitably connected at its upper end with plunger 63 by a link 65. The lever is provided with a slot 66. A revolving disk 67 carries a pin 68, which works in the slot 66 and imparts reciprocating movement to the plunger 63. The cigarettes are now ready to be forced into the folding device.

The folder 70 (shown in Figs. 1 and 2) consists of a box of suitable size to admit the articles to be wrapped, and at its entrance is provided with a slot 71. Into this slot descends the wrapper, which stands just in front of the cigarettes, so that when they are thrust forward they strike against the wrapper and carry it into the folder. The wrapper is thus folded over the top and bottom of the cigarettes by the upper and lower faces of the folding device, and as it advances, the forward corners of the wrapper contact with the rollers 72, whereby they are bent inwardly, Figs. 1 and 2, the wrapper at this stage assuming the form shown in Fig. 12. Erected upon the sides of the folder, Figs. 2 and 6, are two flat pieces c, which enter between the extended top and bottom margins of the wrapper and lie close to the sides of the package to keep the cigarettes in position as they advance. They extend beyond the cone-shaped rollers 73, and as the package continues to advance the upper side margins of the wrapper contact with these cone-shaped rollers, whereby the upper margins are partly bent down over the sides of the package, and as the package advances these margins pass within the projections 74, located on either side of the passage-way, and are thereby bent down straight with the side of the package, which then assumes the form shown in Fig. 13. Continuing to advance, the package enters the press 75, which is provided with a vertically-moving top 76. It lies in this press with the lower side margins extended, as shown at 77, Fig. 5. While in this position these margins receive a supply of paste by which they adhere to the upper margins when turned up and upon them. The paste-supplying device is shown in Fig. 7.

Figure 15:
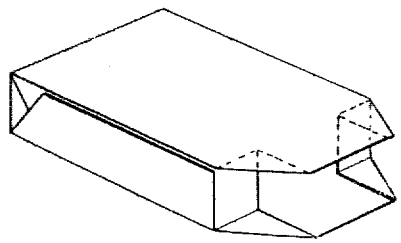
Figure 16:
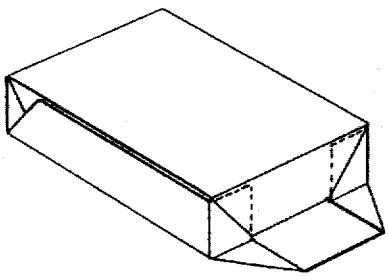

The levers 78, located on either side of the press, have a reciprocating movement, and pivoted to the upper end of these levers are the arms 79, which carry the rollers 80. When these rollers are at rest, they contact with the paste-carrying rollers 81, which supply their peripheries with paste, and as they are advanced by the reciprocating levers 78 they pass over the lower projecting margins of the wrapper and supply them with paste necessary to adhere them to the upper margins already turned down and ready to receive them. The device for supplying paste to these lower margins consists of a paste-box 82, within which a shaft 83 revolves, Fig. 6. This shaft carries a series of cross-pins 84, which agitate the paste in the box as the shaft revolves. Within the box is a cylinder. (Shown in dotted lines at 85, Fig. 7.) In the side of the box 82 there is a slot, into which the peripheries of rollers 81 enter and contact with the cylinder 85, receiving the paste, which it transfers to the rollers 80 on the end of the arm 79. These rollers pass over the lower side margins of the wrapper as they lie under the press, which is now ready to be lowered to turn up these lower margins upon the upper ones. From the top or lid 76 of the press, projects an arm 86, and works up and down upon the guide-rods 87. To this arm is pivoted one end of rod 88 and at the other to an arm 89, which has a vertical reciprocating movement and raises and lowers the lid 76 of the press. As it descends it carries the package with it, and the lower side margins are doubled over and upon the upper ones by contacting with the side walls 90. It continues to descend until the package reaches the channel 91, where it lies just in front of the plunger 92. The package is now in the form shown in Fig. 14 and while in this position is ready for the pincers 93, which turn in the front edges. These pincers are shown in Fig. 2. They are suitably pivoted to a part of the frame at one end, as shown at 94, and the pivots carry the pinions 95, which mesh with each other. An arm 96, pivoted to one of the pincers at one end, is provided with a pin 97. A revolving disk 98 is provided with a groove 99, into which groove the pin 97 enters and as the disk revolves imparts a back-and-forward movement to the pincers, which are adjusted to contact with the front side edges and turn them in, as shown in Fig. 15. As the package lies with one of its sides in front of plunger 92, this plunger now moves forward and forces the package through the channel 91 until the top front flap contacts with the conical wheel 100, Fig. 2, which turns this flap down partly until it contacts with the projections 101, which completes the turning until these flaps lie in contact with the contents of the package, as shown in Fig. 16, until the package enters the second press, which is constructed like the former one, already described, and is provided with a vertically-movable top 102. In this press the package lies with its lower front flap exposed and ready to receive paste from a second pasting device, as shown in Fig. 11. This device is constructed like the one already described and consists of a paste-receptacle 103, within which the paste is placed and through which extends the shaft 104, provided with the cross-pins 105 for agitating the paste. An upright shaft 106 operates the agitating device, as shown in Fig. 1. Below the upper or hopper part of the box the device is circular, and within it is placed a cylinder 107, revolving upon a shaft 108. The circular part of the paste-box is slotted, and in the slot is placed the revolving paste-wheels 109, which contacts with 107 and receives paste therefrom upon its periphery. Under the table is located a disk 109, Fig. 10, which is provided on its face with a cam-groove. An upright rod 110 is provided with a pin 111, which works in this groove and gives a vertical reciprocating movement to the rod 110. At its upper end this rod is pivotally connected with arm 112. This arm is pivoted at 113 and on its other end carries a roller 114, which rises with the arm and contacts with paste-roller 109, where it receives its paste and then descends upon the exposed lower front flap of the wrapper.

Figure 17:
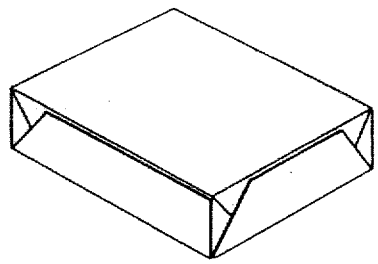

Viewing Fig. 11, the package is shown in a position ready to be lowered, and immediately below the package is shown in section a part of the side wall of the press 115. The press-lid 102 then descends, forcing the package down into the channel 116, leading to the drying-trough 117, and as it descends the lower flap, which is now provided with paste is turned up upon the upper flap by contacting with the wall 115. The mechanism which raises and lowers the press-lid 102 is shown in Fig. 10. A revolving disk 118 is provided with a cam-groove. The upright rod 119 is provided at its lower end with a pin 120, which works in the cam-groove and gives a vertical reciprocating movement to the rod, which at its upper end is pivotally connected with the arm of the lid 121, as shown at 122. The wrapper is now lying in the channel 116 and is finished, as shown in Fig. 17. It is now ready to be thrust forward into the drying-box 117 by a plunger 123. Fig. 10 shows the mechanism for operating this plunger. A lever 124, suitably pivoted to the frame, is connected with an extension 125 of the plunger by an arm 126. A disk 127, carrying a pin 128, works in an eccentric groove 129, reciprocating the arm 124, and thus operates the plunger 123. As each finished package enters the channel 116 this plunger forces it into the drying-box, which may be made of any suitable length, as shown in Fig. 10, thus giving the paste on the package time to dry in passing through the box. This drying-box is shown more clearly in Fig. 2. At the corners of this box are placed the rollers 130, and at the opposite end of the box are located a similar pair of rollers. Around these an endless belt 131 of suitable material is passed, its chief object being to take up any paste which would otherwise adhere to the sides of the box. These belts may be taken off and renewed at pleasure.

The main features of the apparatus have now been fully described except the wrapper-feeding and card-feeding devices, which are constructed and operated as follows: The card-feeding device is located over the carrier at any point beyond the feed-box. Its object is to drop a card, photo, or other advertising material on top of the article to be wrapped while in the carrier, by which it is conveyed, with the cigarettes, in front of the plunger 45 and by that plunger forced, with the wrapper, into the folder, where the wrapper is doubled over the card, and when the package is completed remains inside. The wrapper-feeding device is constructed similarly, and a description of one will serve to describe the other. This wrapper-feeder is located above and over the folder in position to drop a wrapper into the chute 132, which descends through the slot and is arrested and held in such position that the cigarettes when forced against it by the plunger 45 will strike the wrapper about midway of its length and force it into the folder. The uprights 133 support an inclined box or trough 134, into which a number of the wrappers of proper size are placed. These wrappers lie in the box with their lower edges in contact with a cylinder 135. It will be seen that in this position the wrappers form a bevel, of which the bottom one is the edge. The cylinder 135 has a square axle 136, which slides in slots 137, formed in the upright pieces 138, and retains its position against the bevel formed by the lower edges of the wrapper by gravity. The effect of this is to retain the wrapper in the box, allowing only the lower one to pass between it and the revolving wheel or wheels 139, of which there may be any number. These wheels are bare, as shown at 140, through a part of their peripheries, and the other part is covered with india-rubber or other suitable material 141. This india-rubber is timed to contact with the bottom wrapper as it lies in the box and force it out while the cylinder 135 retains the others. This bottom wrapper passes between the cylinder and wheels 139, thence between the rollers 142 and 143 into the chute 132, down to its position in front of the folder.

The mechanism for operating the wheels 139 consists of the revolving upright shaft 144 and the pinions 145 and 146. The card-feeding device is constructed like the wrapper-feeder. It consists of the upright frame 148, supporting the box 149, within which the cards are placed in the same way as the wrappers in the device above described. The wheels 150, carrying the rubber 151, impel the lower card forward between them and the retarding-wheels 152 and between the wheels 153 and 154 into the chute 155, from which they drop upon the cigarettes in each section of the carrier and are conveyed thereby to the mouth of the folder and forced therein by the plunger 45, where they remain within the wrapper when it is folded.

The device for arresting the wrapper in position between the article to be packed and the opening to the folding device is shown in Figs. 1 and 7. A plate $a$, secured to the frame by a screw $b$, is located in position, so that when the wrapper reaches the plate it is stopped and held until forced into the folder.

The mechanism for giving movement to the wrapper and card feeding devices is shown in Fig. 3. The upright shaft 144 carries a pinion 145, which meshes with beveled pinion 146, which turns a shaft $o$, upon which is carried an intermediate wheel. This wheel carries the rubber-tipped wheels 139, which feed the wrappers. Pinion 145 also meshes with wheel $i$, which in turn meshes with wheel $j$, the pinion $j$ with $k$, which turns the rollers $l$ and $m$ to impel the wrapper forward. The shaft $o$ carries the wheel $p$, which meshes with wheel $q$ and turns the shaft $r$, carrying wheel 5, meshing with $t$, and gives movement to the devices of the card-feeder.

The mechanism which gives movement to plunger 92 is shown in Fig. 7. Suitably pivoted to the frame is the lever $u$, which is slotted, and a revolving disk $w$, carrying a pin $x$, works in this slot, reciprocates the lever $w$, which is connected at its upper end with a projection from plunger 92.

It will be seen from the foregoing description that this packaging apparatus departs from the usual packaging-machine in that it contains no compressing device. The "presses" so called for want of a better name, do not compress the package and cause rupture or breakage of wrapper or its contents, as this defect in the machines is a source of annoyance and frequently causes considerable loss. This apparatus contains two presses, whose chief purpose is to retain the package, with its margins or flap extended to receive the paste, and then force it down to turn over the flap or margins. The wrapper-feeding and card-feeding devices are a great improvement, as they effectually distribute the wrappers or cards one at a time and overcome the annoyance of feeding several of them, which has often been the case in other devices. The endless carrier adapts itself readily to other packages for different articles. The other operations of the machine are performed by plungers which work against the package gently and do not break the wrapper or mutilate its contents.

What we claim is—

1. In a packaging-machine, a traveling carrier, divided into sections; each of said sections adapted to conform to the size and shape of the contents of the package to be formed, and menas for impelling the carrier intermittently a distance of one section at a time, in combination with a feeding device adapted to supply the carrier with the material to be packed, a box to receive the material from the carrier means for stopping the carrier to present one of the sections in front of the opening to the box, a folding device and a plunger for impelling the material from the carrier to the box, and a plunger for forcing the material through the box and presenting it in front of the folding device, a wrapper-feeding device adapted to present a wrapper between the folder and the material to be packed, and a plunger for forcing the material to be packed against the wrapper to impel both into the folder, and devices at the mouth of the folder to fold the wrapper over and about the top and bottom of the material 'to be packed.

2. In a packaging-machine a traveling carrier divided into sections adapted to conform to the size and shape of the contents of the package to be formed, and devices for distributing the material into the sections of the carrier, means for impelling the carrier a distance equal to one section at a time, a box to receive the material to be packed from the carrier, and a plunger to force the material from the carrier into the box in combination with a plunger for impelling the material through the box, and present it in front of a folding device, a wrapper-distributer, provided with devices for adjusting a wrapper between the material to be packed and the folding device, a plunger for impelling the material against the wrapper, and forcing both together into the folding device, and a folding device provided with means for turning in the rear edges and turning down the top side margins of the wrapper.

3. In a packaging-machine a folding device and means for impelling the contents of package to be formed in front of it, devices for adjusting a wrapper between the folding device and the article to be packed, and a plunger for impelling both into the folding device, in combination with stationary means within the folding device for turning in the rear edges and folding down the top margins of the wrapper upon the sides of the contents of the package, a press to receive the package in this condition, a plunger for forcing the contents of the package into the press, means for supplying paste to the lower side margins of the wrapper while in the press, devices for lowering the package in the press, means for turning up the lower side margins, while the package is descending and a channel below the press to receive the package when lowered.

4. In a packaging-machine means for impelling the charge for the package in front of a folding device, means for presenting a wrapper between the article to be packed and the entrance to the folding device, a plunger for impelling the charge to be packed against the wrapper and forcing both into the folding device and through said device into a press, stationary means within the folding device for turning down the upper side margin of the wrapper and turning in its rear edge and a press to receive the package and retain it while its lower side margins are exposed, in combination with devices for applying paste to the lower side margins while in the press, means for lowering the package in the press, means within the press for turning up these margins, upon the upper ones, a channel located below the press to receive them, devices for turning in the front edges, while the package is in the channel, a plunger for impelling the package into a second press, and means located between the two presses for turning down the upper front flap during the passage of the articles to be packed from one press to the other.

5. In a packaging-machine a folding device provided with means for folding in the rear edges, and folding down the top side margins of a wrapper, upon the contents of package to be formed, a press to receive said contents and means for impelling it into the press, devices for applying paste to said lower side margins while in the press, means for forcing the package downward, and devices for turning up the lower side margins, and a channel below the press to receive the package, in combination with a plunger to impel the package through the channel, means for turning down the upper front flap in its passage through the channel, another press to receive it, means for applying paste to the lower front flap while in the second press, devices for lowering the package in the press, a channel to receive it located below the press, a plunger for impelling the package through the channel, and a drying-box to receive the package from the channel.

In testimony whereof we, the said IGNACIO LAZAGA and FRANK W. LEV, have signed our names to this specification, in the presence of two subscribing witnesses, this 31st day of March, 1905.

IGNACIO LAZAGA.
FRANK W. LEV.

Witnesses:
JULIUS KALDOR,
CHAS. A. JURKA.